(12) United States Patent
Tashiro et al.

(10) Patent No.: US 6,705,774 B2
(45) Date of Patent: Mar. 16, 2004

(54) CAMERA APPARATUS

(75) Inventors: Hiroyuki Tashiro, Fukuoka (JP); Shinji Aiura, Fukuoka (JP)

(73) Assignee: Matsushita Electric Industrial Co., Ltd. (JP)

( * ) Notice: Subject to any disclaimer, the term of this patent is extended or adjusted under 35 U.S.C. 154(b) by 29 days.

(21) Appl. No.: 09/997,993

(22) Filed: Nov. 30, 2001

(65) Prior Publication Data

US 2002/0085844 A1 Jul. 4, 2002

(30) Foreign Application Priority Data

Nov. 30, 2000 (JP) ..................................... 2000-364226
Mar. 13, 2001 (JP) ......................................... 2001-69989

(51) Int. Cl.[7] .......................... G03B 17/00; H04N 9/47
(52) U.S. Cl. ........................................ 396/427; 348/143
(58) Field of Search ................................ 396/419, 427; 348/143, 158

(56) References Cited

U.S. PATENT DOCUMENTS 5,028,997 A * 7/1991 Elberbaum .................. 348/143
5,802,412 A * 9/1998 Kahn .......................... 396/427
6,268,882 B1 * 7/2001 Elberbaum .................. 348/143
6,354,749 B1 * 3/2002 Pfaffenberger, II ......... 396/427
6,503,000 B1 * 1/2003 Kim ............................ 396/427
6,595,704 B2 * 7/2003 Ambrose .................... 396/427

FOREIGN PATENT DOCUMENTS

JP          7-42261           7/1995

* cited by examiner

*Primary Examiner*—Christopher Mahoney
(74) *Attorney, Agent, or Firm*—Rossi & Associates

(57) ABSTRACT

A camera apparatus which includes a casing; a pan unit having an external video incident section; a pan shaft; a pan shaft support; pan driving means for rotating the pan unit about the pan shaft; a tilt unit having an internal video incident section and tilt face; a tilt shaft; tilt driving means for rotating the tilt unit about the tilt shaft; and a camera disposed inside the tilt unit. This configuration allows to visibly recognize the movement of the camera, and increases the design flexibility by covering an internal mechanism. Moreover, the apparatus may be downsized by reducing the unused space inside. Furthermore, a simple mechanism increases the productivity of the camera apparatus.

19 Claims, 10 Drawing Sheets

CAMERA APPARATUS

FIELD OF THE INVENTION

The present invention relates to camera apparatuses used for crime prevention, surveillance, monitoring, and observation, and more particularly to a camera apparatus configured with a simple mechanism that enables the visual recognition of the movement of its video incident section.

BACKGROUND OF THE INVENTION

Camera apparatuses equipped with a camera, typically using a CCD (charge coupled device), are often placed on ceilings, floors, walls, etc. in various locations such as banks, shops, and amusement centers for surveillance, monitoring, observation, and crime prevention. These camera apparatuses have a mechanism that pans the camera from side to side and tilts the camera up and down. This mechanism allows the camera to aim in the target direction from the installed position to capture a broader view.

The Japanese Utility Model Laid-Open No. H7-42261 (hereafter referred to as "the prior art") discloses one of these conventional camera apparatuses. The prior art has the following configuration.

The prior art is a surveillance camera for monitoring the surrounding area by moving the camera in three dimensions, and comprises a base whose circumference is attached in pivotable fashion to the wall or ceiling of a building; a camera body supported by the base that allows it to pivot back and forth; a pan motor for rotating the base circumferentially; and a tilt motor for pivoting the camera body back and forth.

The base comprises a cylindrical support section for supporting the camera body and an anchoring section, which is secured onto the wall, for supporting this support section. The pan motor is disposed to the side of the support section in the base. A driving mechanism is provided for transmitting the force exerted by the pan motor along or in parallel with the circumference of the base support section. The camera body is cylindrical, and a driving mechanism is provided for transmitting the force exerted by the tilt motor along or in parallel with the circumference of the camera body.

However, the prior art has the following disadvantages.

(1) Since the entire apparatus is covered with a spherical (dome) cover, its appearance, including shape and color, is limited, restricting design flexibility.

(2) The pivoting shaft for the camera body is disposed at the rear end of the camera body. This increases the pivoting radius when the camera body pivots, making the apparatus larger.

(3) The entire apparatus is covered by a spherical dome cover, and thus the dome radius needs to be made larger than the pivoting radius of the camera body. Accordingly, space not required for pivoting the camera body is present inside the dome, making the apparatus larger.

SUMMARY OF THE INVENTION

The present invention solves the above disadvantages, and offers a camera apparatus which enables visual monitoring of camera movements, higher flexibility in design by enclosing the mechanism, smaller camera apparatus by reduced unused space inside the apparatus, and increased productivity by use of a simple mechanism.

The camera apparatus of the present invention includes:

(a) a tilt unit which tilts about a first rotation axis when a camera is installed at the front of the first rotation axis;
(b) a pan unit which pans about a second rotation axis perpendicular to the first rotation axis when the pan unit rotatably holds the tilt unit and tilt driving means for rotating the tilt unit is provided at the back of the first rotation axis; and
(c) a casing which rotatably holds the pan unit and has pan driving means for rotating the pan.

Another camera apparatus of the present invention includes:

(a) a casing which has an opening on at least one face;
(b) a pan unit which is disposed on the casing and has an external video incident section;
(c) a pan shaft disposed on the pan unit;
(d) a pan shaft support disposed near the opening for rotatably supporting the pan shaft;
(e) pan driving means for rotating the pan unit about the pan shaft;
(f) a tilt unit which has an internal video incident section and a tilt face inside the pan unit concealed from the external video incident section, and this tilt unit is disposed such that the external video incident section and internal video incident section are visibly coupled;
(g) a tilt shaft disposed on the pan unit;
(h) a camera disposed inside the tilt unit; and
(i) a tilt unit driving means which is disposed inside the pan at the back of the tilt shaft for rotating the tilt unit about the tilt shaft and.

The above configurations reduces unused space inside the apparatus and enables the apparatus to be downsized. In addition, its simple mechanism offers a camera apparatus with high productivity.

DETAILED DESCRIPTION OF THE INVENTION

Exemplary embodiments of the present invention are described below with reference to drawings.

First Exemplary Embodiment

Figure 1:
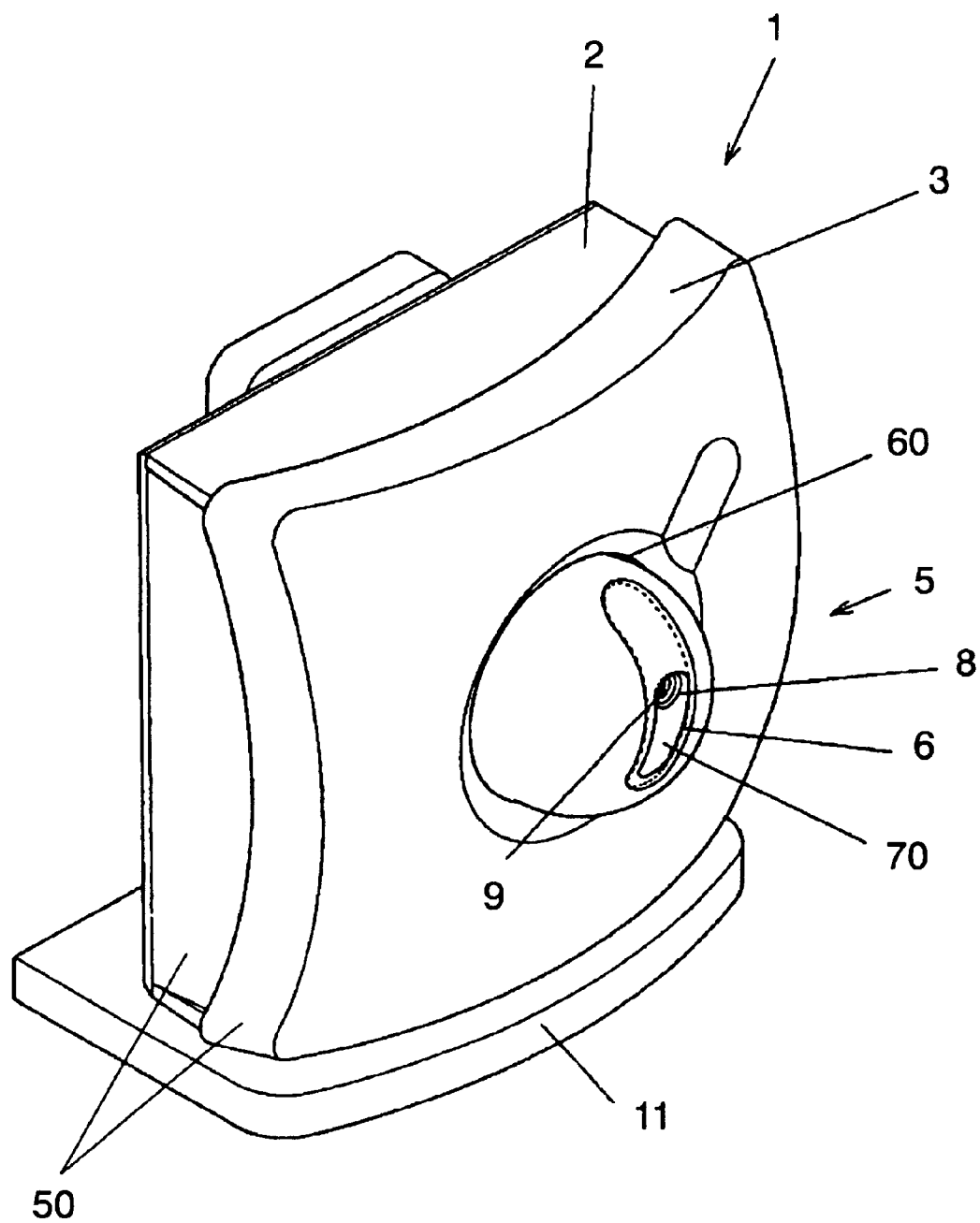
FIG. 1 is a perspective view of the part concerned of a camera apparatus in accordance with exemplary embodiments of the present invention.
Figure 2:
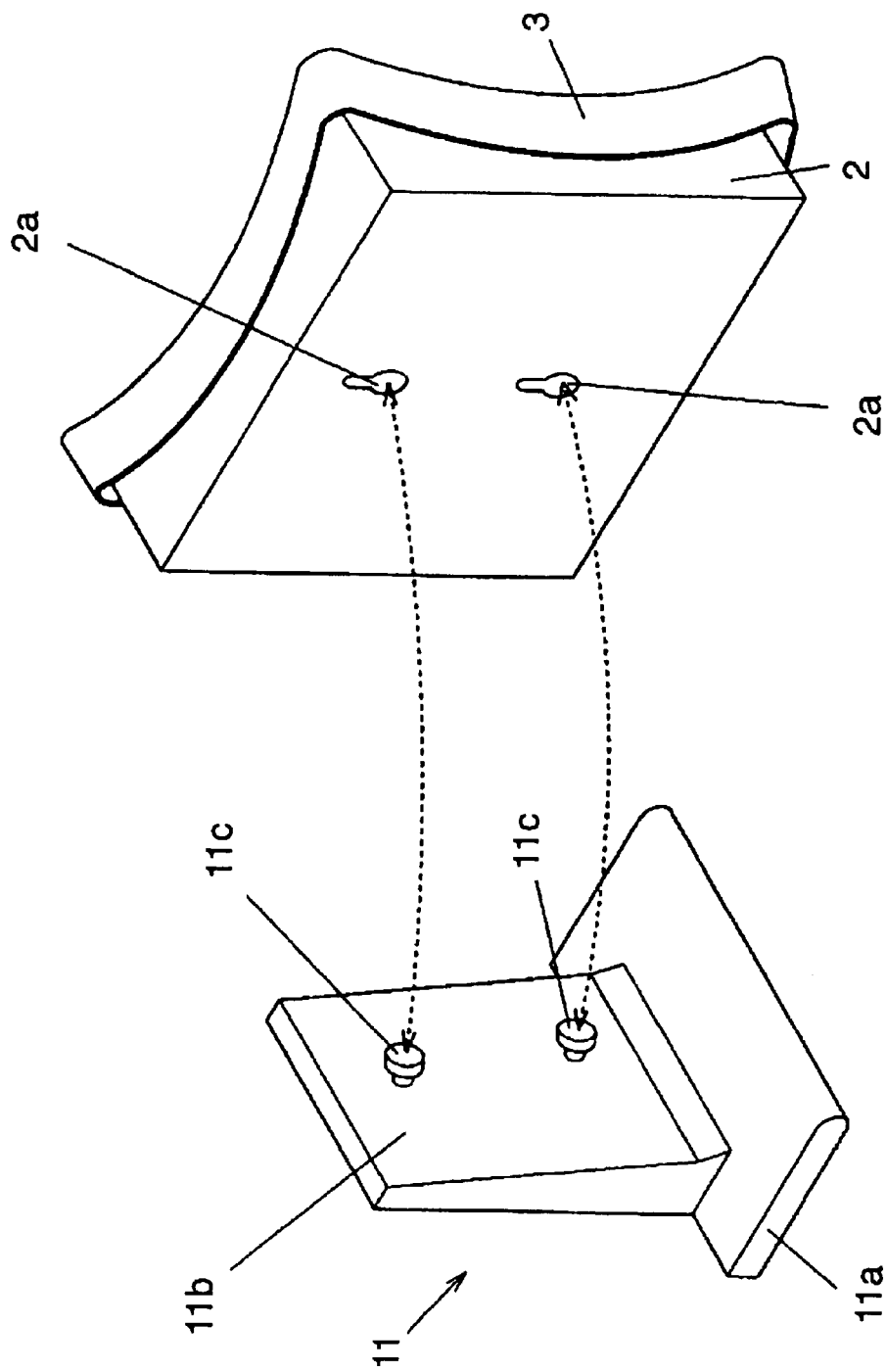
FIG. 2 is a perspective view of the part concerned illustrating the state before attaching a camera holder of the camera apparatus in FIG. 1.
Figure 3:
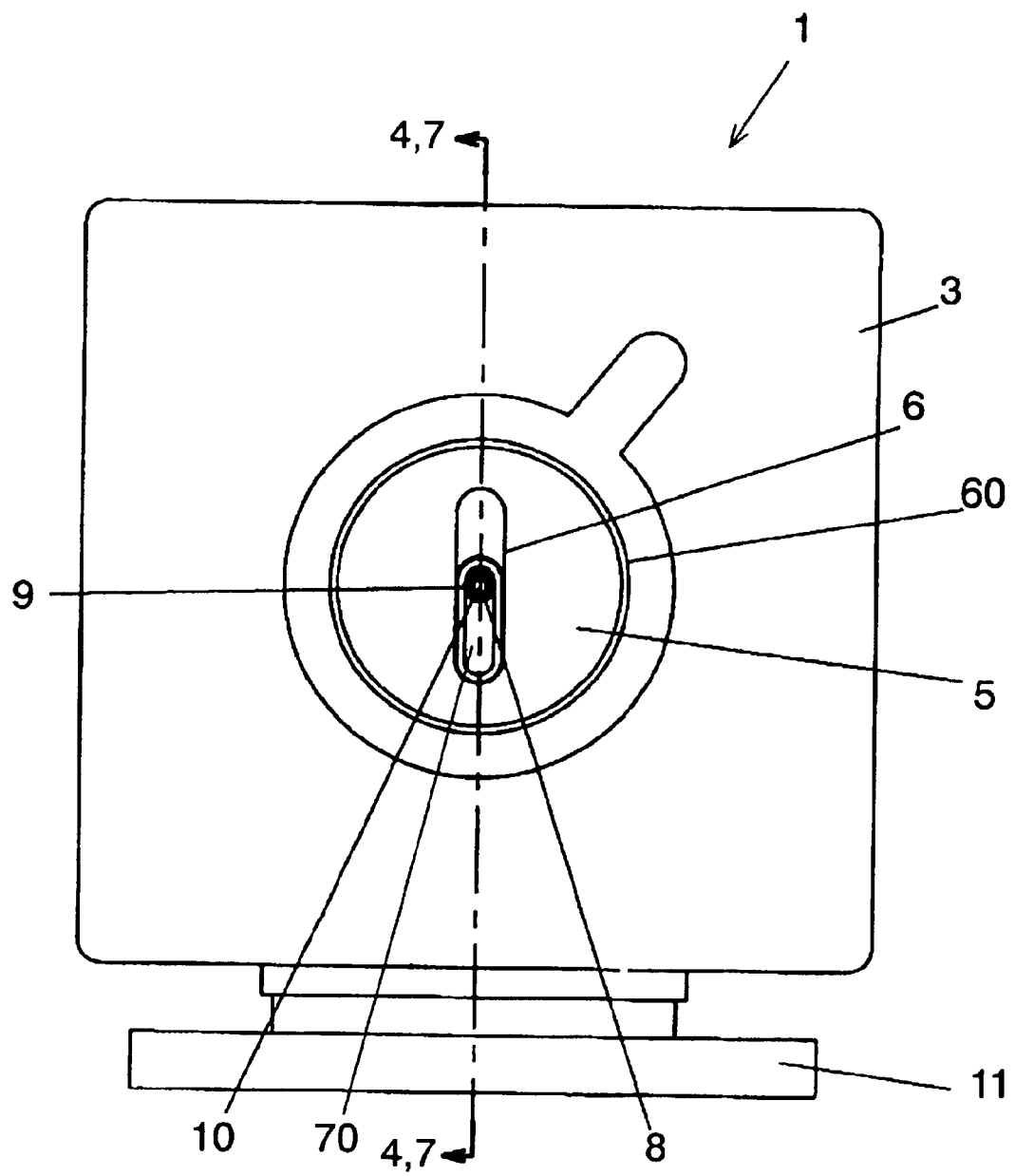
FIG. 3 is a front view of the part concerned of the camera apparatus in FIG. 1.

FIG. 1 is a perspective view of the part concerned of a camera apparatus in exemplary embodiments of the present invention. FIG. 2 is a perspective view of the part concerned illustrating the state before attaching a camera holder of the camera apparatus in FIG. 1. FIG. 3 is a front view of the part concerned of the camera apparatus in FIG. 1.

First, in FIGS. 1, 2, and 3, camera apparatus 1 in the first exemplary embodiment has base 2 which is a box with one open face. Hooking hole 2a is created at the upper and lower parts of a rear face of base 2. Cover 3 fits onto the opening of base 2. Base 2 and cover 3 thus form casing 50 for camera apparatus 1.

Opening 60, which is approximately round, is provided at approximately the center of cover 3. Spherical hollow pan unit 5 provided inside cover 3 is inserted through opening 60 and a part of pan unit 5 protrudes outward from cover 3. External video incident section 6, which is roughly oval, is formed on the surface of pan unit 5. Spherical tilt face 70, which is roughly oval, is provided inside pan unit 5 so as to cover external video incident section 6 from inside pan unit 5.

Roughly circular internal video incident section 8 is formed at approximately the center of tilt face 70 in a way so as to be visibly coupled to external video incident section 6. Camera 9 is disposed inside internal video incident section 8, and captures external images through external video incident section 6 and internal video incident section 8. Camera 9 has lens 10. Camera holder 11 supports and secures camera apparatus 1 for attaching camera apparatus 1 to a range of areas including ceiling, wall, and floor. This camera holder 11 has base 11a, camera anchoring section 11b integrally formed with base 11a in a way approximately perpendicular to the upper face of base 11a, and two hooks 11c at the upper and lower parts on one side face of anchoring section 11b. These hooks 11c are respectively inserted and fitted to two hooking holes 2a on base 2 of camera apparatus 1.

Base 2 is a prism-shaped, cylindrical, or triangular prism-shaped box or frame.

Round hooking holes 2a are respectively created on the rear face of base 2, and their circumference is provided with hanging notches.

External video incident section 6 and internal video incident section 8 are, for example, formed as follows. External video incident section 6 and internal video incident section 8 are created by making a hole in the surface of pan unit 5 or tilt face 70. The hole created in the surface of pan unit 5 or tilt face 70 may be covered with a transparent or semi-transparent synthetic resin or glass. Alternatively, a part of the surface of pan unit 5 or tilt face 70 is formed with transparent or semitransparent synthetic resin or glass.

Camera 9 integrally rotates when the tilt unit (described later) rotates, and is adjustable to the required vertical angle from the horizontal to about 45 degrees downward.

Camera holder 11 is configured with base 11a and camera anchoring section 11b. Base 11a is a board with an adhesive area or screw hole for securing camera apparatus 1 on the ceiling, wall, floor, etc. As shown in FIG. 2, anchoring section 11b is integrally formed with base 11a, and is practically perpendicular to base 11a. The front face of this anchoring section 11b is 5 to 20 degrees, preferably about 10 degrees, tilted from the perpendicular with respect to base 11, and two hooks 11c are provided on this front face.

Both hooks 11c correspond to hooking holes 2a provided on the rear face of base 2 of camera apparatus 1, and are formed in vertical symmetry. Both hooks 11c fit to respective hooking holes 2a so that the rear face of base 2 and front face of camera anchoring section 11b are integrally connected. This enables, for example, to install camera 9 facing upward at about 10 degrees from the horizontal for gaining a wider field of view by installing camera holder 11 on the floor and securing base 2 to anchoring section 11b. If anchoring section 11b is tilted 5 degrees or less from the perpendicular, it has a narrower upward field of view from the place where camera apparatus 1 is installed. If anchoring section 11b is tilted for 20 degrees or more from the perpendicular, it has a correspondingly narrower downward field of view.

In addition, since hooks 11c are formed in vertically symmetric positions, camera apparatus 1 may be kept hooked without the need to invert it when camera holder 11 is flipped to screw base 11a onto a ceiling.

Figure 4:
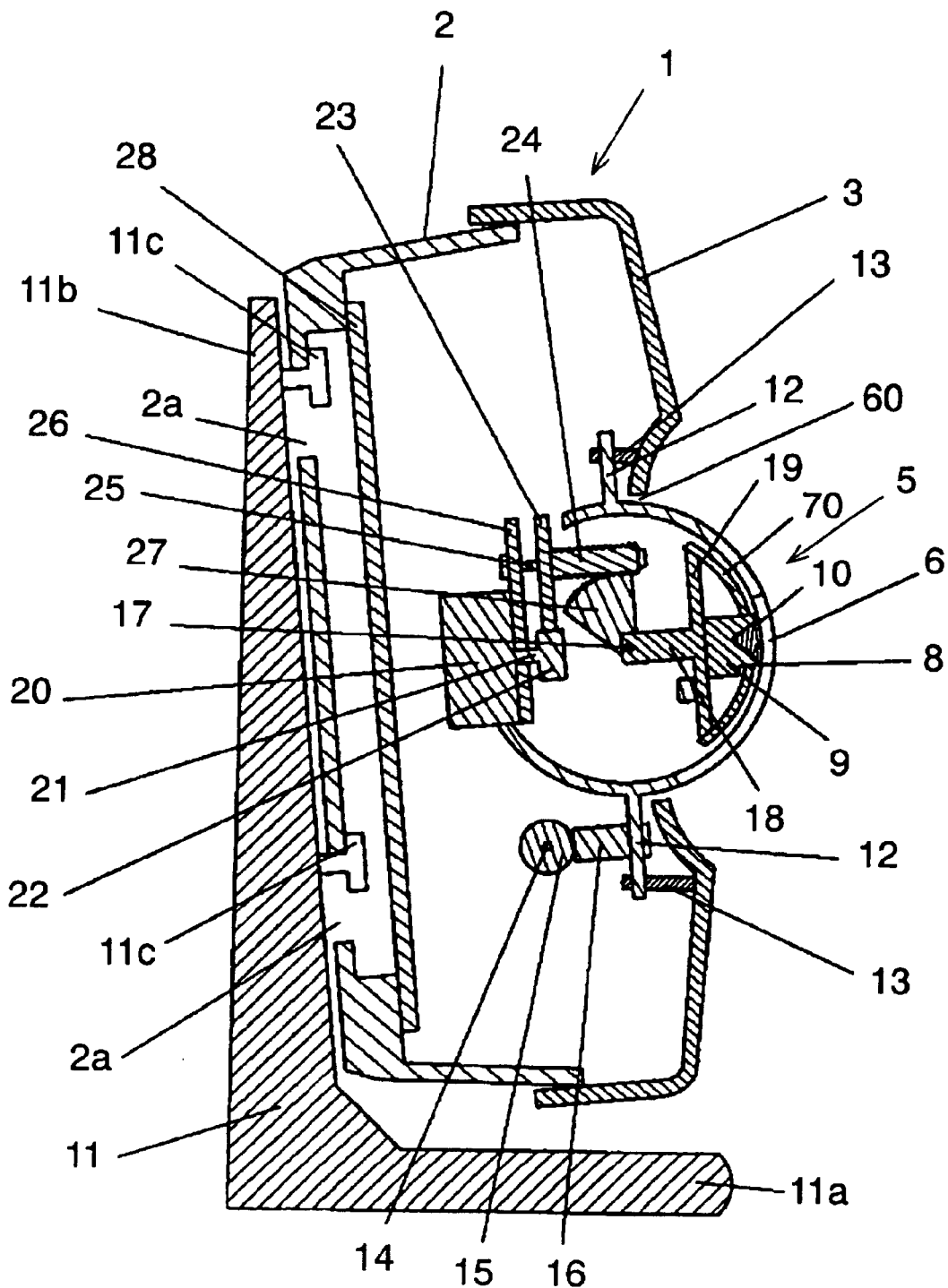
FIG. 4 is a sectional view of the camera apparatus taken along Line 4—4 in FIG. 3 in accordance with a first exemplary embodiment of the present invention.

FIG. 4 is a sectional view of a camera apparatus in the first exemplary embodiment of the present invention taken along Line 4—4 in FIG. 3.

In FIG. 4, camera apparatus 1, base 2, hooking holes 2a, cover 3, opening 60, pan unit 5, external video incident section 6, tilt face 70, internal video incident section 8, camera 9, lens 10, camera holder 11, base 11a, camera anchoring section 11b, and hooks 11c are the same as those illustrated in FIGS. 1, 2, and 3. Accordingly, descriptions for these parts are omitted by giving the same reference numerals.

Pan shaft 12 is integrally formed on an outer wall of pan unit 5 at the upper and lower areas so that pan shaft 12 is coaxial to a spherical center axis of pan unit 5. Pan shaft support 13 is formed on an inner wall of cover 3 at the upper and lower areas near opening 60, and rotatably supports pan shaft 12.

Pan gear shaft 14 is disposed perpendicular to pan shaft 12. Pan worm gear 15 is journaled on gear shaft 14. Pan worm wheel 16 is fixed to pan shaft 12, and rotates by engaging worm gear 15.

Here, pan shaft 12, support 13, gear shaft 14, worm gear 15, and worm wheel 16 configure pan driving means.

Tilt shaft 17 (first rotation axis) is disposed on the inner wall of pan unit 5 coaxial to the spherical center axis of pan unit 5. One end of tilt support 18 is journaled on tilt shaft 17. Tilt unit 19 has tilt face 70 disposed inside pan unit 5, and is fixed to the other end of tilt support 18.

Tilt motor 20 inside pan unit 5 is disposed opposing to tilt unit 19 with the spherical center axis of pan unit 5. Driving shaft 21 of tilt motor 20 is disposed perpendicular to tilt shaft 17.

Tilt small gear 22 is fixed to the end of driving shaft 21. Tilt large gear 23 engages small gear 22 and rotates together with it. Tilt worm gear 24 is integrally formed with large gear 23, and rotates coaxial to a rotation axis of large gear 23. Large gear 23 and worm gear 24 are journaled on tilt gear shaft 25.

Tilt gear shaft support 26 is fixed to tilt motor 20, and supports gear shaft 25. Tilt worm wheel 27 is fixed to the end of tilt support 18 supported by tilt shaft 17, and engages worm gear 24 for rotating about tilt shaft 17 (first rotation axis).

Here, tilt motor 20, driving shaft 21, small gear 22, large gear 23, worm gear 24, gear shaft 25, support 26, and worm wheel 27 configure tilt driving means.

Camera 9 is mounted at the front of tilt unit 19. Tilt worm wheel 27 is installed at the back of tilt unit 19. Tilt shaft 17 rotatably holds tilt unit 19 for vertical rotation.

Pan shaft support 13, which is formed on cover 3 (casing), rotatably holds pan unit 5 for horizontal rotation via pan shaft 12 (second rotation axis). Pan worm wheel 16 is placed at the bottom end of pan unit 5.

Tilt worm gear 24 engages tilt worm wheel 27 to effect vertical rotation of tilt unit 19. Pan worm gear 15 engages pan worm wheel 16 to effect horizontal rotation of pan unit 5. Tilt worm wheel 27 and tilt worm gear 24 engage at the position higher than the rotation center axis (tilt shaft 17) of tilt unit 19, and pan worm wheel 16 and pan worm gear 15 engage at the position lower than the rotation center axis (tilt shaft 17) of tilt unit 19.

Board 28 is disposed inside base 2, and electrical circuits are formed on board 28. A controller (not illustrated) controls tilt motor 20 to rotate tilt motor driving shaft 21 in the required directions.

The operation of the camera apparatus in the first exemplary embodiment as configured above is described next.

Figure 5:
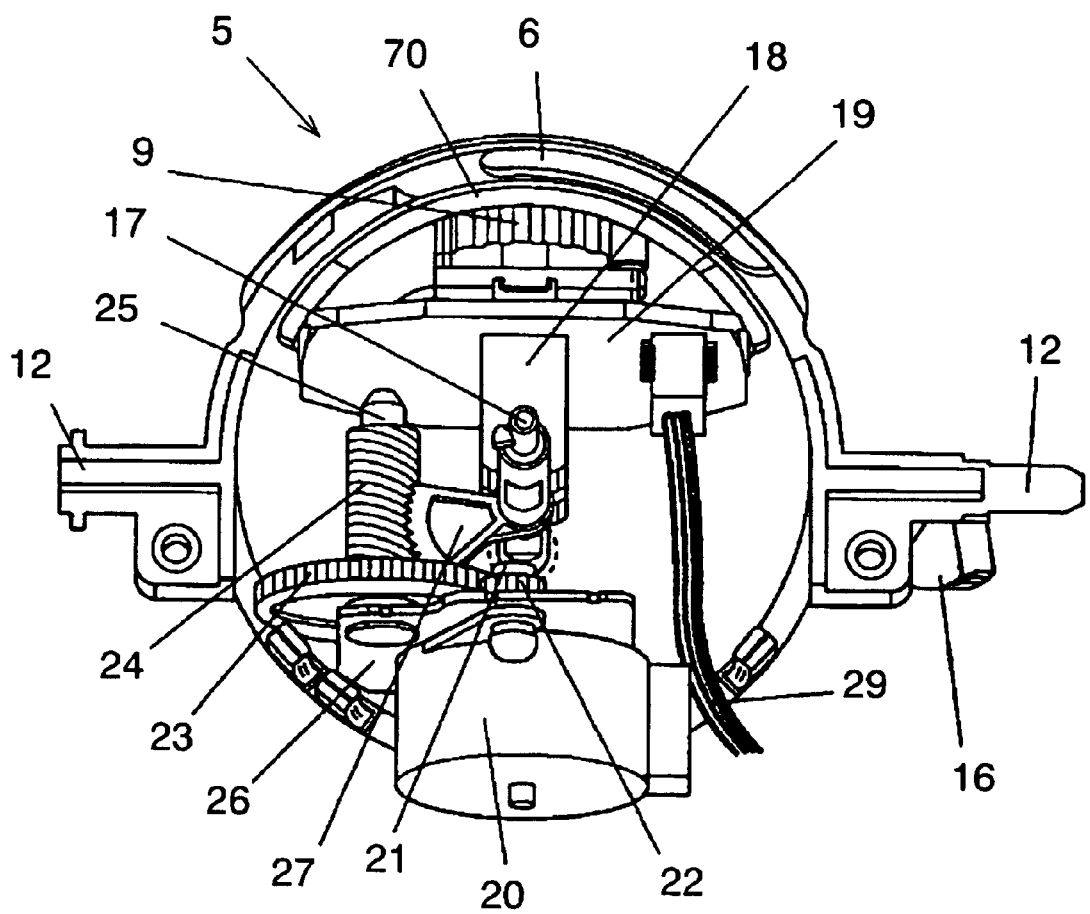
FIG. 5 is a perspective view of the part concerned illustrating inside a pan unit of the camera apparatus in FIG. 4.

FIG. 5 is a perspective view of the part concerned of the camera apparatus in FIG. 4 for illustrating inside the pan.

In FIG. 5, pan unit 5, external video incident section 6, tilt face 70, camera 9, pan shaft 12, tilt shaft 17, tilt support 18, tilt unit 19, tilt motor 20, tilt motor driving shaft 21, small gear 22, large gear 23, tilt worm gear 24, tilt gear shaft 25, tilt gear shaft support 26, and tilt worm wheel 27 are the same as those described in FIG. 4. Accordingly, descriptions for these parts are omitted by giving the same reference numerals. Lead wire 29 electrically couples camera 9 and board 28.

Figure 6:
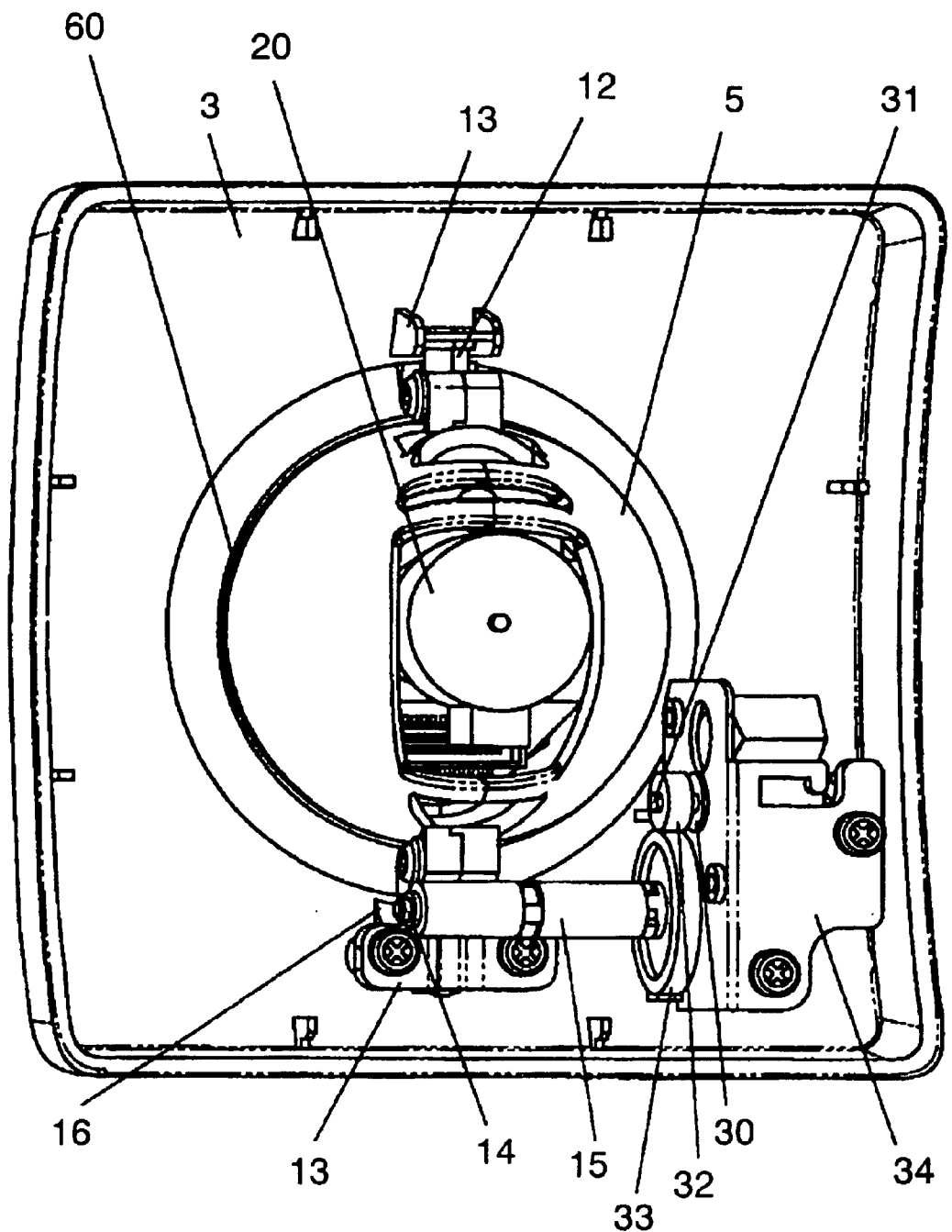
FIG. 6 is a perspective view of the part concerned illustrating inside a cover of the camera apparatus in FIG. 4.

FIG. 6 is a perspective view of the part concerned illustrating the inside the cover of the camera apparatus in FIG. 4.

In FIG. 6, cover 3, opening 60, pan unit 5, pan shaft 12, pan shaft support 13, pan gear shaft 14, pan worm gear 15, pan worm wheel 16, and tilt motor 20 are the same as those described in FIG. 4. Accordingly, descriptions for these parts are omitted by giving the same reference numerals.

Pan motor 30 is fixed to cover 3. The force exerted by pan motor 30 rotates driving shaft 31 of pan motor 30. Pan small gear 32 is fixed to driving shaft 31, and rotates together. Pan large gear 33 is integrally and rotatably disposed on pan worm gear 15 to rotate about pan gear shaft 14, and engages small gear 32 for rotation. Pan gear shaft support 34 secures pan motor 30, and supports gear shaft 14. The controller (not illustrated) controls pan motor 30 to rotate driving shaft 31 in the required directions.

Here, pan motor 30, driving shaft 31, small gear 32, large gear 33, gear shaft 14, worm gear 15, worm wheel 16, and pan shaft 12 configure pan driving means.

Camera apparatus 1 in the first exemplary embodiment allows camera 9 to be pivoted horizontally through pan operation, and camera 9 to be pivoted vertically through tilt operation. Camera 9 thus captures images in the required directions by combining pan and tilt operations. Pan and tilt operations of camera apparatus 1 are described separately below. In normal use, camera apparatus 1 executes pan and tilt operations at the same time to direct camera 9 in the required directions.

(a) Pan Operation of Camera 9 (FIG. 6)

First, pan motor 30 is driven to rotate pan motor driving shaft 31. In response to this rotation, pan small gear 32 fixed to driving shaft 31 rotates about driving shaft 31. In response to the rotation of pan small gear 32, pan large gear 33, engaged with small gear 32 and pan worm gear 15 integrally formed with large gear 33 respectively rotate about pan gear shaft 14. Then, in response to this rotation, pan worm wheel 16, engaged with worm gear 15, rotates about pan shaft 12. This makes pan shaft 12 rotate, and accordingly pan unit 5 rotates about pan shaft 12.

Pan motor 30 is designed to rotate driving shaft 31 clockwise and counterclockwise, that is, in the required direction. Pan operation to pivot camera 9 clockwise and counterclockwise is thus implemented by controlling the rotating direction of pan motor 30.

(b) Tilt Operation of Camera 9 (FIG. 5)

First, tilt motor 20 is driven to rotate tilt motor driving shaft 21. In response to this rotation, tilt small gear 22 fixed to driving shaft 21 rotates about driving shaft 21. In response to this rotation, tilt large gear 23, engaged with small gear 22, and tilt worm gear 24 formed integrally with large gear 23 respectively rotate about tilt gear shaft 25. Then, in response to this rotation, tilt worm wheel 27, engaged with worm gear 24, rotates about tilt shaft 17. This makes tilt shaft 17 rotate, and accordingly, tilt unit 19 rotates about tilt shaft 17.

Tilt motor 20 is designed to rotate driving shaft clockwise and counterclockwise, that is, in the required direction. Tilt operation to vertically pivot camera 9 is thus implemented by controlling the rotating direction of tilt motor 20.

Next, the effects of the camera apparatus in the first exemplary embodiment are described.

(1) The force exerted by tilt motor 20 is transmitted in the sequence of driving shaft 21, small gear 22, large gear 23, worm gear 24, worm wheel 27, tilt support 18, and tilt unit 19. Tilt unit 19 thus rotates about tilt shaft 17 by driving tilt motor 20. This simple mechanism facilitates manufacture, and in turn fosters better productivity.

(2) The movement of pan unit 5 and tilt unit 19 may be confirmed from outside through opening 60 on cover 3 and external video incident section 6 of pan unit 5. In addition, the movement of camera 9 and lens 10 may be confirmed through internal video incident section 8 formed on tilt face 70 of tilt unit 19.

This allows to confirm by eye the movement of camera 9, thus enabling the confirmation of the video-shooting direction of camera apparatus 1 from outside.

(3) The mechanism inside camera apparatus 1 is covered with base 2, cover 3, pan unit 5, and tilt face 70. This gives more flexibility in appearance and design including shape and color.

(4) Pan unit 5 is spherical and hollow, and pan shaft 12 is coaxial to the spherical center axis of pan unit 5. In addition, tilt motor 20 and camera 9 are disposed at the front and rear of pan shaft 12 at opposing positions. This minimizes the rotation radius of pan unit 5 to the left and right, enabling the entire camera apparatus to be made more compact.

(5) In pan unit 5, tilt unit 19 pivots only at the lower part of pan unit 5. Accordingly, sufficient pivoting space for tilt unit 19 may be secured at the lower part of pan unit 5 by disposing tilt worm wheel 27 at the upper part of pan unit 5. The internal space of spherical hollow pan unit 5 may thus be used efficiently to make pan unit 5 smaller, and thus camera apparatus 1 smaller.

(6) In pan unit 5, tilt shaft 17 is coaxial to the spherical center axis of pan unit 5. This enables the rotation radius of tilt unit 19 which rotates about tilt shaft 17 to be made smaller. Pan unit 5 may in turn be made smaller, and thus camera apparatus 1 smaller.

(7) Tilt unit 19 is disposed inside pan unit 5, and thus pan unit 5 and tilt 19 are integrally manufactureable. This improves productivity, and in turn reduces cost.

(8) Hooks 11c are formed symmetrically in the vertical direction. This allows base 2 to be hooked onto camera holder 11 such that base 11a is below base 2. Alternatively, base 2 may be hooked onto camera holder 11 such that base 11a is above base 2. Accordingly, the body of camera apparatus 1 may be placed or fixed to the floor or ceiling by camera holder 11 without the need to invert the entire apparatus.

(9) Camera anchoring section 11b is tilted about 10 degrees from the perpendicular. This makes camera 9 tilted 10 degrees upward from the horizontal when camera apparatus 1 is placed on a flat surface such as the floor, allowing a wider area to be captured.

The upward field of view becomes narrower from the location where camera apparatus 1 is installed if camera anchoring section 11b is tilted 5 degrees or less from the perpendicular. On the other hand, tilting over 20 degrees from the perpendicular restricts the downward field of view from the location where camera apparatus 1 is installed.

Second Exemplary Embodiment

Figure 7:
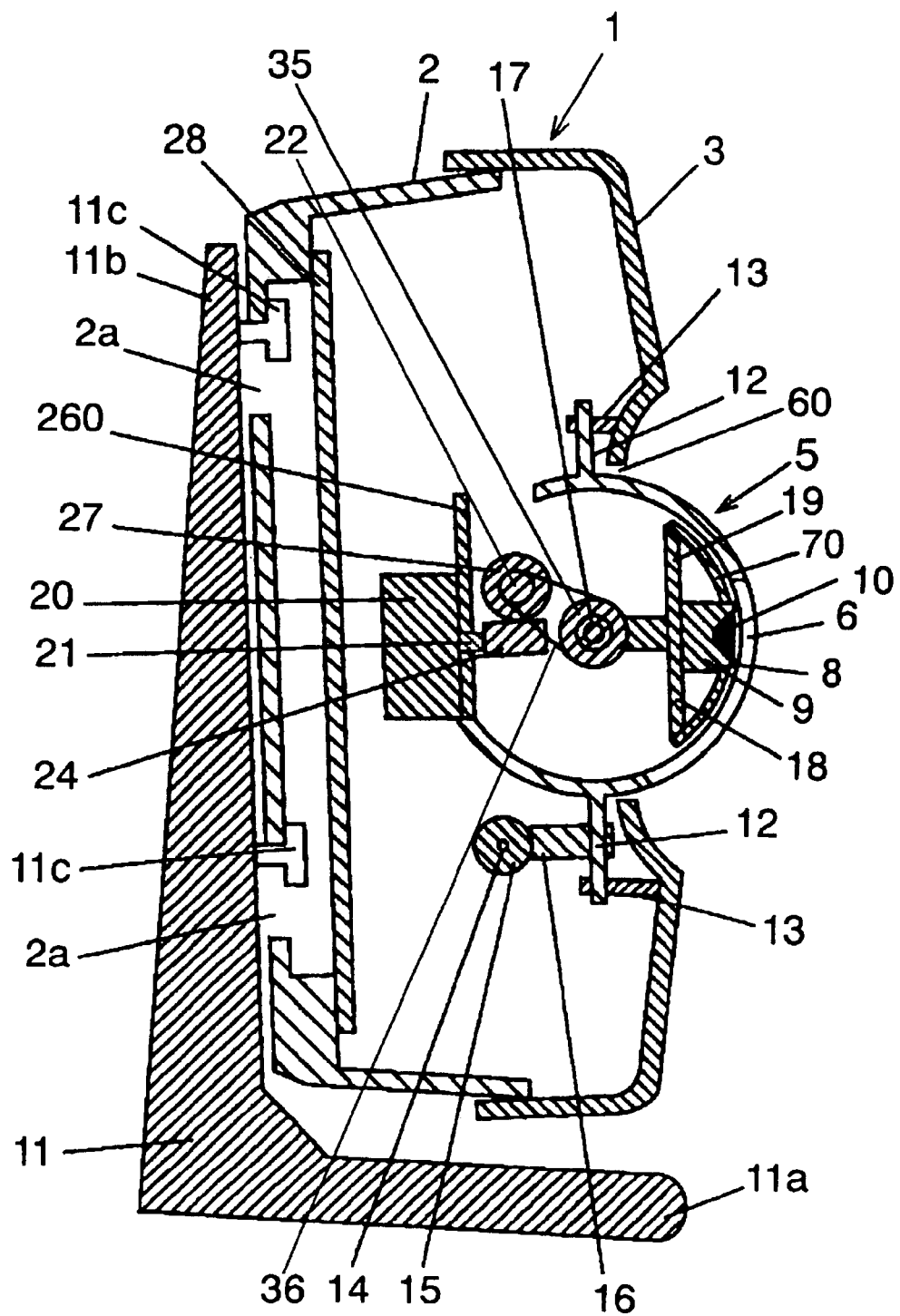
FIG. 7 is a sectional view of the camera apparatus taken along Line 7—7 in FIG. 3 in accordance with a second exemplary embodiment.

FIG. 1 is a perspective view of the part concerned of a camera apparatus in exemplary embodiments of the present invention. FIG. 2 is a perspective view of the part concerned illustrating the state before attaching a camera holder in the camera apparatus in FIG. 1. FIG. 3 is a front view of the part concerned of the camera apparatus in FIG. 1. FIG. 7 is a sectional view of the camera apparatus in a second exemplary embodiment taken along Line 7—7 in FIG. 3.

The only difference in the second exemplary embodiment from the camera apparatus in the first exemplary embodiment is the tilt driving section. Accordingly, descriptions on FIGS. 1 to 3 are omitted since they are the same as those in the first exemplary embodiment.

In FIG. 7, camera apparatus 1, base 2, hooking holes 2a, cover 3, opening 60, pan unit 5, external video incident section 6, tilt face 70, internal video incident section 8, camera 9, lens 10, camera holder 11, base 11a, camera anchoring section 11b, and hooks 11c are the same as those illustrated in FIGS. 1, 2, and 3. Accordingly, descriptions for these parts are omitted by giving the same reference numerals.

Pan shaft 12 is integrally formed on an outer wall of pan unit 5 at the upper and lower areas so that pan shaft 12 is coaxial to the spherical center axis of pan unit 5. Pan shaft support 13 is formed on the inner wall of cover 3 at the upper and lower areas near opening 60, and rotatably supports pan shaft 12.

Pan gear shaft 14 is disposed perpendicular to pan shaft 12. Pan worm gear 15 is journaled on gear shaft 14. Pan worm wheel 16 is fixed to pan shaft 12, and rotates by engaging worm gear 15.

Tilt shaft 17 is disposed on an inner wall of pan unit 5 coaxial to the spherical center axis of pan unit 5. One end of tilt support 18 is journaled on tilt shaft 17. Tilt unit 19 has tilt face 70 inside pan unit 5, and is fixed to the other end of tilt support 18.

Tilt motor 20 is disposed inside pan unit 5 opposing tilt unit 19 with the spherical center axis of pan unit 5. Driving shaft 21 of tilt motor 20 is disposed perpendicular to tilt shaft 17.

Tilt worm gear 24 is fixed to tilt motor driving shaft 21, and rotates coaxially to this driving shaft 21. Tilt worm wheel support 260 is fixed to tilt motor 20, and tilt worm wheel 27 is rotatably attached to tilt worm wheel support 260. This worm wheel 27 engages worm gear 24 and rotates together.

Tilt shaft gear 35 is attached to tilt support 18, and is rotatable about tilt shaft 17. Belt 36 is hooked between tilt small gear 22 and shaft gear 35 so that worm wheel 27 and shaft gear 35 operate in synchronization. Here, small gear 22 is configured so as to integrally rotate with worm wheel 27.

Here, tilt motor 20, driving shaft 21, small gear 22, worm gear 24, worm wheel 27, shaft gear 35, and belt 36 configure tilt driving means.

Camera 9 is mounted at the front of tilt unit 19, and tilt worm wheel 27 is installed at the back of tilt unit 19 with tilt shaft 17. Tilt shaft 17 rotatably holds tilt unit 19 for vertical rotation.

Pan shaft support 13, which is formed on cover 3, rotatably holds pan unit 5 for horizontal rotation via pan shaft 12. Pan worm wheel 16 is placed at the bottom end of pan unit 5.

Tilt worm gear 24 engages tilt worm wheel 27, and rotates tilt shaft gear 35 together through small gear 22 and belt 36 to rotate tilt unit 19. Pan worm gear 15 engages pan worm wheel 16 to rotate pan unit 5. Worm wheel 27 and worm gear 24 engage at the position higher than the rotation center axis of tilt unit 19. In addition, worm wheel 16 and worm gear 15 engage at the position lower than the rotation center axis (tilt shaft 17) of tilt unit 19. However, the present invention is not limited to the above engagement positions.

Board 28 is disposed inside base 2, and electrical circuits are formed on board 28. A controller (not illustrated) controls tilt motor 20 to rotate driving shaft 21 in the required direction.

The operation of the camera apparatus in the second exemplary embodiment as configured above is described with reference to drawings.

Figure 8:
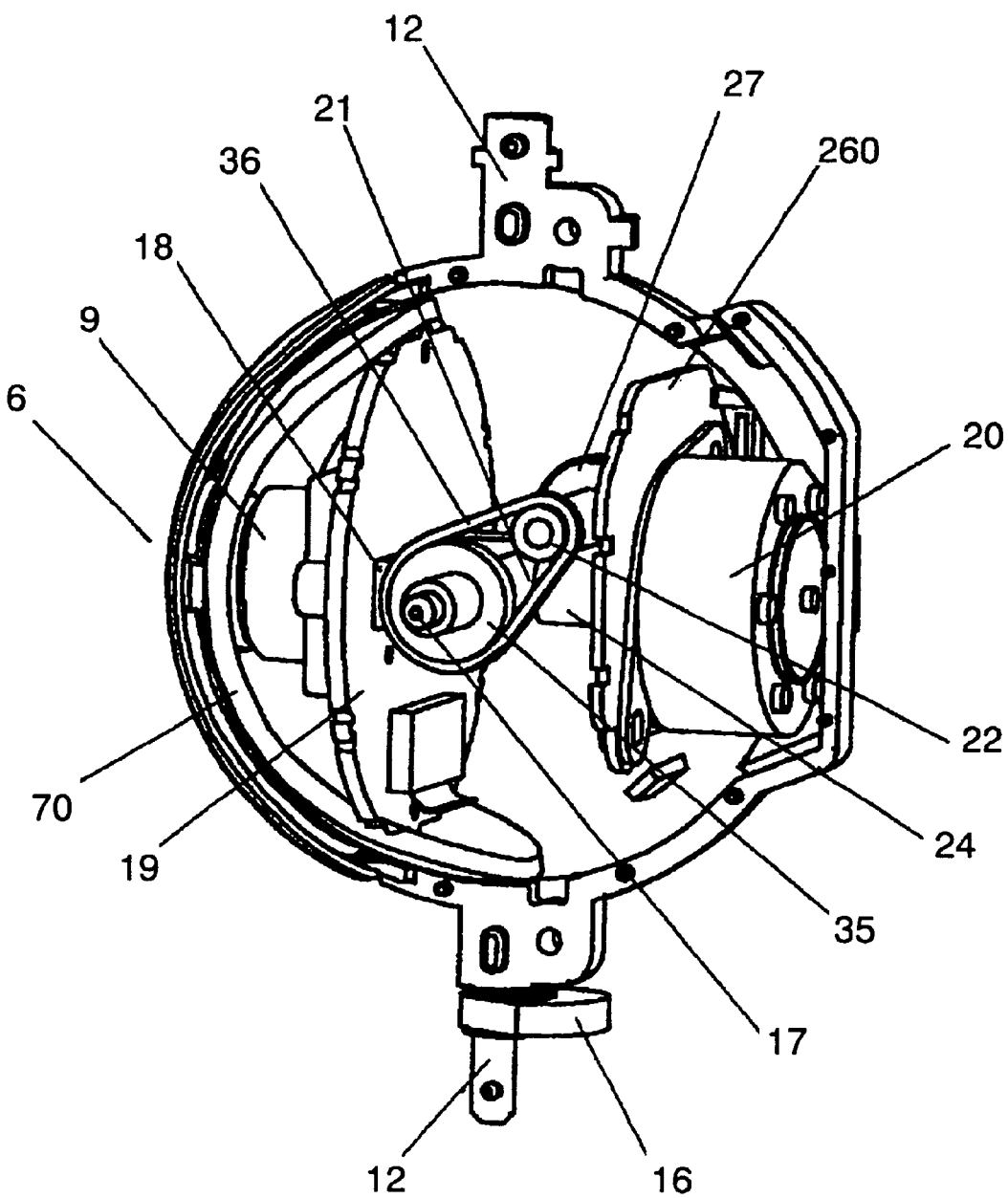
FIG. 8 is a perspective view of the part concerned illustrating inside the pan unit of the camera apparatus in FIG. 7.

FIG. 8 is a perspective view of the part concerned inside the pan of the camera apparatus in FIG. 7.

Camera apparatus 1 in the second exemplary embodiment features, as in the first exemplary embodiment, has a pan operation for pivoting camera 9 horizontally and tilt operation for pivoting camera 9 vertically. Camera 9 may be directed in the required direction for capturing images by combining pan and tilt operations. The second exemplary embodiment differs from the first exemplary embodiment only in the tilt configuration, and thus only the tilt operation is described below, omitting that for pan operation.

For tilting camera 9 (FIGS. 7 and 8), tilt motor 20 is driven to rotate driving shaft 21. Since tilt worm gear 24 is fixed to driving shaft 21, worm gear 24 also rotates when driving shaft 21 rotates. In addition, since worm gear 24 is engaged with tilt worm wheel 27, worm wheel 27 rotates when worm gear 24 rotates. The rotation of worm wheel 27 is then transmitted to tilt shaft gear 35 through small gear 22 and belt 36, and accordingly tilt unit 19 rotates by rotating shaft gear 35 about tilt shaft 17.

Tilt motor 20 is designed to rotate driving shaft 21 clockwise and counterclockwise, that is, in the required direction. Tilt operation to vertically pivot camera 9 is thus implemented by controlling the rotating direction of tilt motor 20.

The configuration of the camera apparatus in the second exemplary embodiment as configured above enables transmission of the force exerted by tilt motor 20 in the sequence of driving shaft 21, worm gear 24, worm wheel 27, small gear 22, belt 36, shaft gear 35, tilt support 18, and tilt unit 19. In other words, tilt unit 19 rotates about tilt shaft 17 as a result of driving tilt motor 20. Accordingly, the camera apparatus in the second exemplary embodiment has a simple mechanism that facilitates better manufacturing productivity, as in the first exemplary embodiment.

Moreover, provision of belt 36 for rotating tilt shaft gear 35 which rotates about tilt shaft 17 during tilt operation allows tilt worm gear 24 and tilt worm wheel 27 to be placed at the side of tilt motor 20. Transmission of rotational force of worm wheel 27 to tilt unit 19 using the belt allows space to be secured at the upper area of the pan unit 5 relatively easily for pivoting tilt unit 19, compared to versions using wheels. Accordingly pan unit S may be made smaller even for vertical tilt operation, resulting in smaller camera apparatus 1.

Since the second exemplary embodiment differs from the first exemplary embodiment only in the tilt driving section, effects (2) to (9) described in the first exemplary embodiment apply in the same fashion to the second exemplary embodiment.

When the camera apparatus is in a video-shooting mode, internal video incident section 8 captures the image through external video incident section 6. When camera apparatus 1 is in a standby mode, tilt motor 20 is driven to effect the rotation of tilt face 70 upward of pan unit 5 so that internal video incident section 8 is concealed from external video incident section 6. This operation is detailed below with reference to FIGS. 9 and 10.

Figure 9:
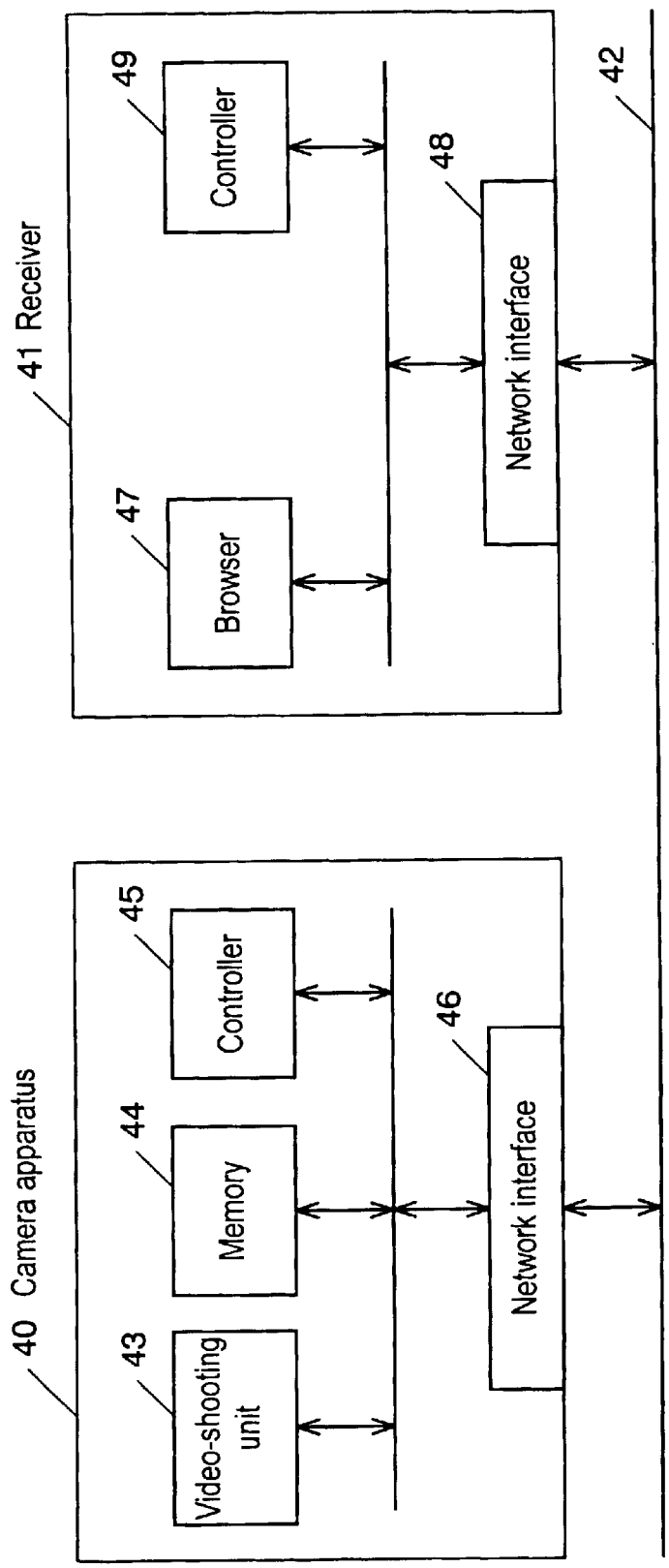
FIG. 9 is a block diagram of the camera apparatus in accordance with the exemplary embodiments of the present invention.
Figure 10A:
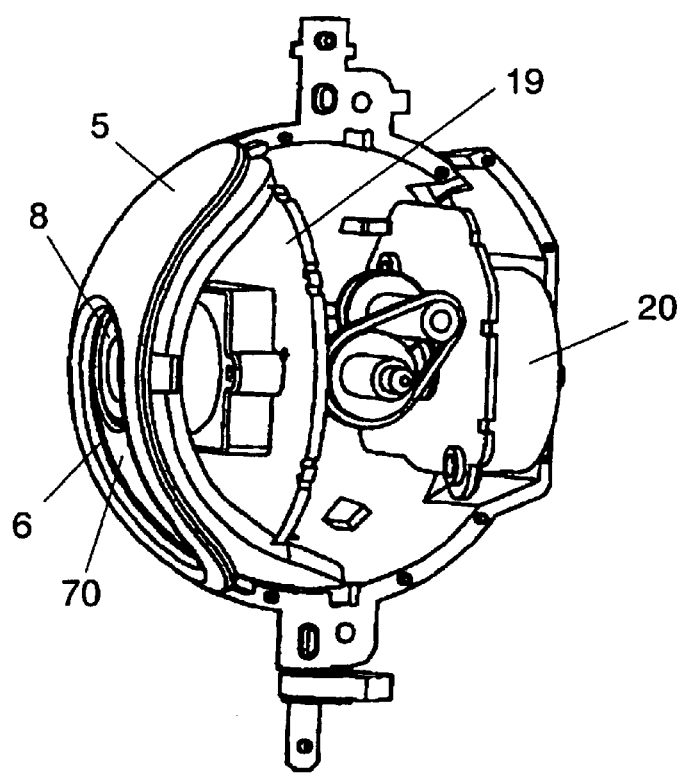
FIGS. 10A and 10B are perspective views of the parts concerned illustrating the position of the pan unit of the camera apparatus in FIG. 7.
Figure 10B:
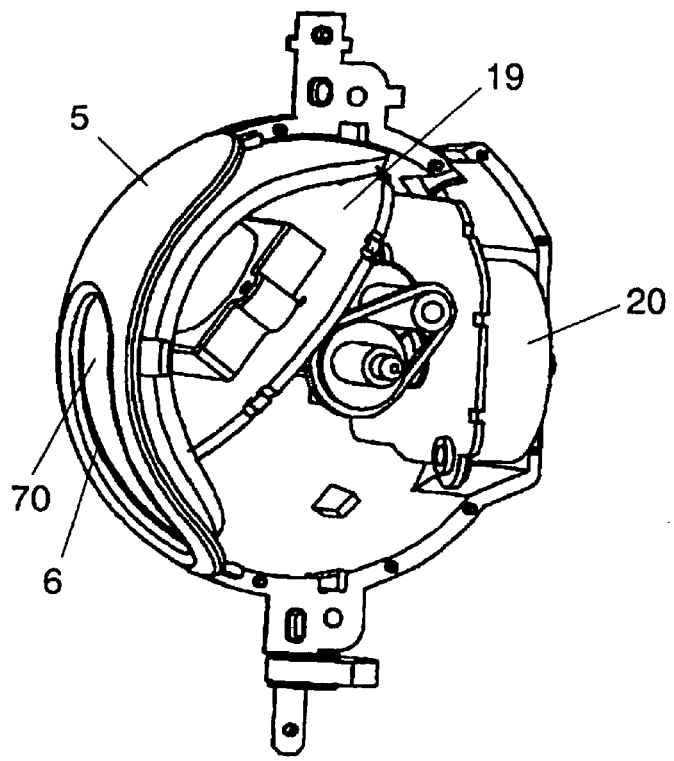

FIG. 9 is a block diagram of the camera apparatus in the exemplary embodiments of the present invention. FIG. 10A shows the normal position (video-shooting position) of the pan unit of the camera apparatus in FIG. 7. FIG. 10B shows the standby position of the pan unit of the camera.

In FIG. 9, camera apparatus 40 captures a target image and transmits video data. Receiver 41 receives and displays the image transmitted from camera apparatus 40 and also controls camera apparatus 40 using control commands. For example, receiver 41 may be a client PC. General network 42 such as the Internet is typically used for transmitting images and control commands.

Video-shooting unit 43 is disposed inside or outside the camera apparatus so as to permit pan and tilt operations, and captures the target image. This is specifically shown in FIGS. 10A and 10B. Memory 44 stores video data taken by video-shooting unit 43. Controller 45 controls video-shooting unit 43, receives control commands for controlling the direction through general network 42, or sends video data to receiver 41. Network interface 46 is provided between general network 42 and camera apparatus 40 for sending and receiving data according to network protocols.

Browser 47 (such as Microsoft's Internet Explorer) installed in receiver 41 receives and displays video data from camera apparatus 40. Browser 47 may also display information on the screen of other servers in general network 42 in accordance with URLs (Uniform Resource Locators) which indicate where target data is stored. Moreover, the video-shooting angle of video-shooting unit 43 may be changed by using a button (not illustrated) displayed on the display screen of browser 47. Network interface 48 exists between general network 42 and receiver 41. Controller 49 controls the entire receiver 41.

The operation of camera apparatus 40 in the second exemplary embodiment is described next relating to receiver 41.

Controller 43 of camera apparatus 40 rotates tilt face 70 upward by driving tilt motor 20 when there is no access from receiver 41, which means, for example, when no address designation signal for camera apparatus 40 is received from browser 47 of receiver 41. More specifically, as shown in FIG. 10B, tilting is executed such that internal video incident section 8 enters inside casing of pan unit 5 so that internal video incident section 8 is completely concealed from the position of external video incident section 6 (this position is hereafter referred to as the "standby position").

On the other hand, when camera apparatus 40 in the standby position is accessed by receiver 41, controller 43 of camera apparatus 40 drives tilt motor 20 to rotate tilt face 70 downward to a predetermined position (changeable by setting) as illustrated in FIG. 10A. Once access is made, camera apparatus 40 does not return to the standby position for a predetermined period even if receiver 41 stops access. This enables the prevention of repeated and frequent tilting between standby and predetermined positions. In addition, image capturing out of the target video-shooting area is preventable by controlling tilt unit 19 so as not to rotate it in the standby position.

The second exemplary embodiment shows an example of automatic standby mode. However, receiver 41 may submit a command to set the camera apparatus to the standby position. For example, the camera apparatus may send html (Hypertext Markup Language) code to receiver 41 to display the standby button on the screen, and this button is clicked at receiver 41 to execute standby.

Moreover, the camera apparatus may be set to the standby position when the power is turned off, and to shift to the predetermined position for video-shooting when the power is turned on.

The above configuration enables information to be provided by the camera apparatus that it is not in the video-shooting mode when internal video incident section 8 is hidden inside the casing of pan unit 5. This reassures people that they are not being monitored when the camera is in standby position. In addition, this structure eliminates the need for a camera case, since internal video incident section 8 of the camera apparatus is concealed inside the casing of pan unit 5 when not in use and thus the casing of pan unit 5 acts as the camera case. Furthermore, this structure eliminates the need to attach the camera case by providing an automatic standby function or giving a command from other equipment to set the camera in the standby position, demonstrating better usability.

As described above, the present invention demonstrates the following advantageous effects.

(1) The movement of the camera can be visually recognized since the movement of the pan and tilt units and camera direction may be confirmed from the outside. This offers a camera apparatus with good usability.

(2) There is great freedom of choice in appearance, including shape and color, because the mechanism inside the camera apparatus is covered with casing, pan unit, and tilt face, offering the potential for more flexible external design.

(3) The tilt unit integrally disposed inside the pan offers a smaller camera apparatus.

(4) The coaxial design of the pan shaft and the spherical center axis of the pan unit minimizes the rotation radius of the pan unit about the pan shaft, offering a smaller camera apparatus.

(5) The coaxial design of the tilt shaft inside the pan unit and the spherical center axis of the pan unit enables reduction of the rotation radius of the tilt unit about the tilt shaft, offering a camera apparatus with a smaller pan unit.

(6) The tilt shaft inside the pan unit is disposed coaxially to the spherical center axis of the pan unit. This enables the tilt unit to be placed inside the pan unit, offering a camera apparatus that is easier to manufacture, thus enabling better productivity to be achieved.

(7) The force exerted by the tilt motor is transmitted in the following sequence: tilt motor driving shaft, tilt worm gear, tilt worm wheel, tilt support, and tilt unit. The tilt unit thus rotates about the tilt shaft by driving the tilt motor. This simple mechanism facilitates manufacture and offers a camera apparatus with good productivity.

(8) The pan and tilt units are integrally manufactureable inside the same sphere by disposing the tilt unit inside the pan unit. This enables the improvement of productivity, and thus offers a camera apparatus at lower cost.

(9) The tilt motor and camera are disposed to the front and back of the pan shaft opposing each other in the pan unit. This allows to minimize the rotation radius of the pan unit about the pan shaft, offering a smaller camera apparatus.

(10) The tilt worm wheel is disposed between the tilt motor and camera inside the pan unit. This makes it possible to dispose the tilt driving means inside the pan unit using the space inside the spherical hollow pan unit efficiently, which in turn reduces the size of the pan unit, and allows to downsize the camera apparatus.

(11) The number of components may be reduced by disposing the tilt worm wheel between the tilt motor and camera. This improves productivity, offering the camera apparatus at lower cost.

(12) The tilt worm wheel may be disposed at the upper part of the pan unit when the tilt unit pivots only at the lower part of the pan unit. This allows sufficient pivoting space to be secured for the tilt unit at the lower part of the pan unit, and thus the space inside the spherical hollow pan may be efficiently used for disposing the tilt driving means inside the pan unit, offering a camera apparatus with smaller pan unit.

(13) The rotation of the tilt worm wheel is transmitted to the tilt unit via the belt inside the pan unit when the tilt unit is intended to be pivoted to the upper area of the pan unit. This facilitates the securing of pivoting space for the tilt unit also in the upper area than that required by a structure using wheels. Accordingly, the pan unit may be made smaller even for vertical tilt operation, and in turn downsize the camera apparatus.

(14) The use of a hooking member such as a screw facilitates hanging and detaching of the camera apparatus on the wall.

(15) The camera support is configured with the base formed into a board and the camera anchoring section disposed on the top face of the base approximately perpendicularly for fixing the casing of the camera apparatus at its front by hooking. At least one hook is provided at vertically symmetric positions on the front of the camera anchoring section. This makes it possible to place the camera apparatus on a desk or cabinet, or secure the base to a wall, ceiling, or floor by adhesive or screw for easier attachment on and detachment from the wall or ceiling, offering good user convenience.

(16) The hook disposed at the front of the camera anchoring section makes it possible to hook the camera apparatus by inserting the hook into a hooking hole created in a rear face of the casing of the camera apparatus. This facilitates securing of the camera apparatus by hooking, offering a camera holder with good user convenience.

(17) The vertically symmetrical shape of the hook enables the casing of the camera apparatus to be hooked onto the camera holder such that the base is placed below the casing of the camera apparatus. In addition, the casing may be hooked onto the camera holder even when the camera holder is inverted and the base is placed above the casing. This makes it possible to place or secure the camera apparatus on either the floor or the ceiling without the need to invert the camera apparatus, offering a camera holder with good user convenience.

(18) The tilt operation is executed to completely conceal the internal video incident section from the position of the external video incident section when in the standby mode. This allows people to visually confirm whether they are being monitored or not because it is apparent that an image is not taken when the internal video incident section is concealed inside the casing of the pan unit. In addition, the casing of the pan unit acts as a camera case because the internal video incident section is concealed inside the casing of the pan when not in use, thus eliminating the need for the camera case. Furthermore, the need to attach the camera case is eliminated by applying a function by which the apparatus returns to the standby mode automatically when the camera is not in use or by setting the apparatus in the standby mode using a command from other equipment, offering good user convenience.

What is claimed is:

1. A camera apparatus comprising:
   (a) a tilt unit in which a camera is installed at the front of a first rotation axis, said tilt unit tilting about said first rotation axis; and having tilt unit driving means for rotating said tilt unit provided at the back of said first rotation axis;
   (b) a pan unit in which said tilt unit is rotatably held, said pan unit panning about a second rotation axis perpendicular to said first rotation axis, said pan unit having a pan shaft disposed on top and bottom thereof; and
   (c) a casing for rotatably holding said pan unit, said casing being provided with pan driving means for rotating said pan unit relative to the casing;
   wherein said pan shaft rotatably supports said pan unit to the casing.

2. A camera apparatus comprising:
   (a) a casing having an opening on at least one face;
   (b) a pan unit disposed on said casing, said pan unit having an external video incident section;
   (c) a pan shaft disposed on said pan unit;
   (d) a pan shaft support disposed near said opening for rotatably supporting said pan shaft;
   (e) pan driving means for rotating said pan unit about said pan shaft;
   (f) a tilt unit having an internal video incident section and a tilt face inside said pan unit, said tilt face being concealed from said external video incident section, and said tilt unit being disposed in a way so as to visibly couple said external video incident section and said internal video incident section;
   (g) a tilt shaft disposed on said pan unit;
   (h) a camera disposed inside said tilt unit; and
   (i) tilt driving means for rotating said tilt unit about said tilt shaft, said tilt driving means being disposed inside said pan unit at the back of said tilt shaft.

3. The camera apparatus as defined in claim 2, wherein:

said opening is round;

said pan unit is spherical hollow; and said pan unit is disposed inside said casing such that a part of said pan unit protrudes outward from said opening in said casing.

4. The camera apparatus as defined in claim 3, wherein said pan shaft is coaxial to a spherical center axis of said pan unit.

5. The camera apparatus as defined in claim 3, wherein said tilt shaft is perpendicular to said pan shaft, and is coaxial to a spherical center axis of said pan unit.

6. The camera apparatus as defined in claim 3, wherein said tilt driving means comprises:

a tilt motor integrally coupled to one of inside and a part of said pan unit;

a tilt worm gear rotating in synchronization with the rotation of a driving shaft of said tilt motor; and a tilt worm wheel rotating about said tilt shaft in synchronization with the rotation of said tilt worm gear.

7. The camera apparatus as defined in claim 6, wherein said tilt motor and said camera are respectively disposed at the front and back of said pan shaft inside said pan unit.

8. The camera apparatus as defined in claim 6, wherein said tilt worm wheel is disposed between said tilt motor and said camera inside said pan unit.

9. The camera apparatus as defined in claim 6, wherein said tilt worm wheel is disposed at a position higher than said tilt shaft inside said pan unit.

10. The camera apparatus as defined in claim 6, further including at least one hooking hole on a rear face of said casing.

11. The camera apparatus as defined in claim 2, wherein said pan shaft is integrally formed on an outer wall of said pan unit at least at one of upper and lower areas; and said pan shaft support is fixedly disposed near said opening at least at one of the upper and lower areas.

12. The camera apparatus as defined in claim 2, wherein said tilt shaft is integrally formed on an inner wall of said pan unit.

13. The camera apparatus as defined in claim 2, wherein said tilt face is practically a part of a spherical face.

14. The camera apparatus as defined in claim 2, wherein said tilt unit is rotatable to a predetermined position where said internal video incident section of said camera is not visibly coupled to said external video incident section of said pan unit.

15. The camera apparatus as defined in claim 14, further comprising a controller for rotating said tilt unit to said predetermined position when said camera apparatus is not in a video-shooting mode.

16. The camera apparatus as defined in claim 14, further comprising a controller having a network interface connectable to a network, and said controller controlling the rotation of said tilt unit in accordance with information received from said network.

17. A camera apparatus comprising:

(a) a tilt unit in which a camera is installed at its front and a tilt worm wheel is installed at its back, said tilt unit being rotatably held for vertically rotating about a tilt shaft;

(b) a pan unit having a pan worm wheel at its bottom end, said pan unit being rotatably held by a pan shaft disposed at its top and bottom ends for horizontal rotation, and said pan unit holding said tilt shaft;

(c) a casing for rotatably holding said pan unit for rotating about said pan shaft;

(d) tilt driving means disposed inside said pan unit, said tilt driving means having a tilt worm gear for rotating said tilt unit by engaging said tilt worm wheel; and (e) pan driving means disposed inside said casing, said pan driving means having a pan worm gear for rotating said pan unit by engaging said pan worm wheel;

wherein said tilt worm wheel and said tilt worm gear engage at a position higher than said tilt shaft;

wherein said pan worm wheel and said pan worm gear engage at a position lower than said tilt shaft; and wherein the tilt wheel is fixed to the tilt unit and the tilt driving means is fixed to the pan unit.

18. A camera apparatus comprising:

(a) a tilt unit in which a camera having an internal video incident section is installed at the front of a first rotation axis, said tilt unit tilting about said first rotation axis; and (b) a pan unit which rotatably holds said tilt unit, said pan unit having an external video incident section to which said internal video incident section is visibly coupled, and said pan unit panning about a second rotation axis perpendicular to said first rotation axis;

wherein said tilt unit is also rotatable to a predetermined position where said internal video incident section and said external video incident section are visibly uncoupled.

19. A camera apparatus comprising:

(a) a pan unit having an external video incident section; and (b) a tilt unit disposed inside said pan unit, said tilt unit having an internal video incident section and a camera, and said tilt unit being rotatable by the rotation of a tilt motor to a first position where said external video incident section and said internal video incident section are visibly coupled;

wherein said tilt unit is also rotatable to a second position where said internal video incident section and said external video incident section are visibly uncoupled.

* * * * *